(12) United States Patent
Diening et al.

(10) Patent No.: US 8,785,818 B2
(45) Date of Patent: Jul. 22, 2014

(54) ATHERMALIZED PERMANENT-ALIGNMENT OPTICAL-ELEMENT MOUNT

(75) Inventors: Andreas Diening, Santa Clara, CA (US); Donald E. Harryman, Sunnyvale, CA (US); Ezra Allee, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 265 days.

(21) Appl. No.: 13/366,135

(22) Filed: Feb. 3, 2012

(65) Prior Publication Data
US 2013/0200062 A1 Aug. 8, 2013

(51) Int. Cl.
*F27D 11/00* (2006.01)
*H01L 21/76* (2006.01)

(52) U.S. Cl.
USPC ............................ 219/385; 439/136; 438/118

(58) Field of Classification Search
USPC ........... 219/385; 439/136–139; 438/118, 106, 438/121–2
See application file for complete search history.

(56) References Cited

U.S. PATENT DOCUMENTS

| | | |
|---|---|---|
| 4,045,129 A | 8/1977 | Hamar |
| 5,210,650 A | 5/1993 | O'Brien et al. |
| 5,930,600 A | 7/1999 | Seelert et al. |
| 5,954,978 A | 9/1999 | Seelert et al. |
| 6,094,180 A | 7/2000 | Mead, Jr. et al. |
| 6,905,354 B1 * | 6/2005 | Zbinden .................. 439/137 |
| 7,520,683 B2 * | 4/2009 | Takai et al. ................ 385/92 |
| 2005/0047747 A1 | 3/2005 | Sano |

OTHER PUBLICATIONS

International Search Report and Written Opinion received for PCT Patent Application No. PCT/US2013/023314, mailed on Jul. 17, 2013, 14 pages.
Invitation to pay additional fees received for PCT Patent Application No. PCT/US2013/023314, mailed on May 7, 2013, 5 pages.

* cited by examiner

*Primary Examiner* — Shawntina Fuqua
(74) *Attorney, Agent, or Firm* — Morrison & Foerster LLP

(57) ABSTRACT

A mounting fixture for mounting an optical element on a base-plate has spaced-apart parallel legs attachable by brackets to the base-plate and a mounting platform attached to the legs. The platform can be heated by a removable heater. The optical element is held in a mounting tab attached to the platform by a solder-pad. Heating the platform softens the solder-pad allowing the tab and the element to be aligned. Removing the heat allows the pad to harden to complete the attachment and retain the alignment of the element on the mount.

14 Claims, 1 Drawing Sheet

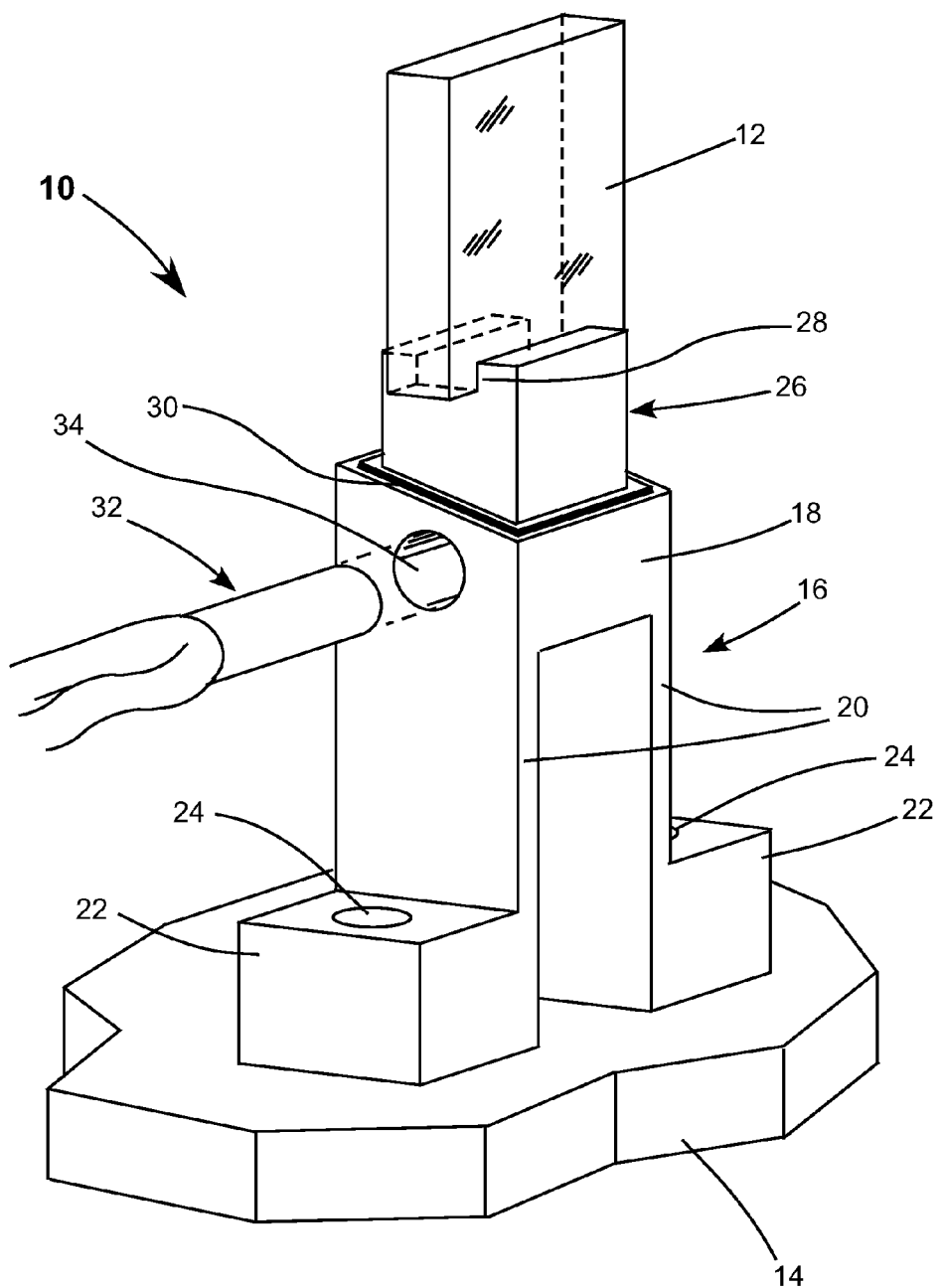

ATHERMALIZED PERMANENT-ALIGNMENT OPTICAL-ELEMENT MOUNT

TECHNICAL FIELD OF THE INVENTION

The present invention relates in general to mounting fixtures for optical elements. The invention relates in particular to optical element mounts that provide for alignment of an optical element during manufacture of optical apparatus such as a laser, but which leave the element essentially permanently aligned following the manufacturing alignment.

DISCUSSION OF BACKGROUND ART

Laser apparatus sold commercially typically includes a plurality of optical elements. Such optical elements include resonator mirrors, beam-steering mirrors, and lenses for focusing or collimating a beam. Most such elements require precise alignment during manufacture of the device, but it is desirable that after this manufacturing alignment is complete the elements stay essentially permanently aligned.

Typical methods for "permanent" alignment of optical elements involve attaching an optical element to a mount or pedestal using a hard-curable adhesive, such as an epoxy, or using a solder bond. In such methods, the optical element is on the mount while the adhesive is soft and uncured or while the solder is in a thermally softened, at least partially molten, condition. After alignment is complete, the adhesive is allowed to cure, or the solder is allowed to solidify. Solder-bonding is preferred as adhesives can create problems traceable to out-gassing products of the adhesives.

One effective solder-bonding method for an optical element is described in U.S. Pat. No. 5,930,600, assigned to the assignee of the present invention. In this method, a positive thermal coefficient thermistor (PCT) is supplied with a constant current to heat the PCT and soften the solder used for bonding. The PCT is bonded to a pedestal attachable to a base-plate on which the optical element is to be mounted. The optical element is bonded on a pedestal attached to the PCT and which can be aligned when the solder is soft. Once the alignment is complete, current to the PCT is cut off and the solder solidifies, maintaining the optical-element in the optical alignment.

While this method is effective and has been verified as reliable through several years of commercial use, the method nevertheless has certain shortcomings. One shortcoming is simply the cost of the PCT, which remains part of the optical element mount once the alignment is completed, yet has no further useful function. Another shortcoming is that two solder bonds are required in the mount. Yet another shortcoming is that careful selection of metal parts is required such that there is an acceptable coefficient of thermal expansion (CTE) match between the mount and the optical element, and between the mount and the base-plate. There is need for a an optical element mount that allows a mounting method similar in principle to that of the '600 patent while at least mitigating, if not altogether eliminating, the above described shortcomings thereof.

SUMMARY OF THE INVENTION

The present invention is directed to mounting and aligning an optical element in optical apparatus such as a laser. In one aspect apparatus in accordance with the present invention comprises a base-plate, an optical element, and an element-holding member, fixedly holding the optical element. A pedestal is provided having a platform-portion for supporting the element-holding member and having spaced-apart legs extending from the platform-member and attached to the base-plate. The element-holding member is attached to the platform-portion of the pedestal by a solder layer. The platform-portion of the pedestal is temporarily heatable by a removable heat-source to soften the solder layer for aligning the element-holding member on the platform-portion of the pedestal.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 schematically illustrates a preferred embodiment 10 of an optical-element mount in accordance with the present invention including an element-holding tab solder-bonded to a mounting-pedestal, the pedestal having a platform heatable by a removable heat-source, the platform having two spaced apart legs attached thereto, the legs being attachable to a base-plate.

DETAILED DESCRIPTION OF THE INVENTION

Referring now to the drawings, wherein like components are designated by like reference numerals, FIG. 1 schematically illustrates a preferred embodiment 10 of an optical-element mount in accordance with the present invention. Here, an optical element 12, to be mounted on a base-plate 14, is fixedly bonded prior to alignment in a slot 28 in an element-holding tab 26. This fixed bonding can be accomplished by either adhesive bonding or solder bonding.

Element-holding tab 26 is supported via a solder pad 30 on a platform or bridge portion 18 of a mounting-pedestal 16. Bridge portion 18 has two elongated spaced apart legs 20 attached thereto. Legs 20 are attachable to base-plate 14 via brackets 22, one attached to each of the two legs. The brackets, and, accordingly, mounting pedestal 16, are secured to the base plate, for example by bolts or screws (not shown) extending through holes 24 in the brackets into or through the base-plate. Attachment of the pedestal to the base-plate takes place before final mounting of element-holding tab 26 (and element 12 therein) to the mounting pedestal.

Platform portion 18 of pedestal 16 is heatable by a temporary heat source. Here, the heat-source is an electrically powered cylindrical cartridge-type heater 32 which is a loose fit in a cylindrical hole or bore 34 extending into or through platform portion 18 of the pedestal. One suitable cartridge heater is a model H050-15-24-01 available from Sun Electric Heater Company of Salem, Mass. In an exemplary mounting operation, heater 32 is inserted into bore 34. Bridge (platform portion) 18 of pedestal 16 is heated sufficient to soften solder 30, but not sufficient to adversely affect the attachment of the optical element to the element holding tab. Optical element 12 is then aligned manually by adjusting tab 26 on the softened solder pad. Once the element is aligned electric power to the cartridge heater is cut-off, allowing solder pad 30 to solidify. The cartridge heater is then removed and can be used for another mounting operation.

One clear advantage of the inventive optical element mount compared with the prior-art mount of the above referenced U.S. Pat. No. 5,930,600 patent is that the heating element is removable after the alignment operation. The one heater can be used for a plurality of mounting operations in a plurality of lasers. In the prior-art method, a heater (PCT) remains with the prior-art mount so there are as many PCTs required as there optical element mounts per laser multiplied by the number of lasers being manufactured.

Another advantage is that attaching pedestal 16 to base-plate 14 via parallel spaced-apart legs 20 provides that the material of the pedestal and tab 16 can be selected to be material which is CTE compatible with the material of the optical element (for minimizing the CTE mismatch), without regard to the material of base-plate 14. By way of example, Invar is CTE compatible with fused silica elements, and stainless steel is CTE compatible with calcium fluoride ($CaF_2$) optical elements. Base-plate 14 is typically an aluminum (Al) alloy in commercial lasers. Aluminum has a CTE about 34-times (depending on a particular aluminum alloy) that of Invar and about 2-times that of stainless steel. Shear forces between the base-plate and the pedestal are minimized by flexure of legs 20.

It was calculated that for a solid pedestal made from Invar made and mounted by two screws to an Aluminum base-plate, a shear-force of 1000 pounds on each screw could result from a temperature change of 40° C. Such a temperature charge could occur during transit of apparatus from a manufacturer to a user and cause misalignment of a mounted element. It was calculated that with a mount in the inventive two-legged configuration, this stress could be reduced to as low as 15 pounds per screw for the same materials and temperature change.

Yet another advantage is that the relatively thin legs 20 of Invar or stainless steel, which both have a relatively low thermal conductivity result in a relatively low transfer of heat from heater cartridge 32 to the base-plate Experimental results indicate that only roughly half of the heat-load is required for softening solder compared with prior-art, monolithic, PTC-based mounts. This results in less heating of the supporting structure, which reduces wait-times (for cool-down) during the alignment process.

As seen in FIG. 1, in one preferred embodiment, the upper surface of pedestal 18 is canted at an angle with respect to the surface of the base plate 14. The lower surface of the element holding tab 26 has a complimentary angled surface. As can be appreciated, with this geometry, sliding the tab 25 forward and back on the pedestal curing alignment will raise or lower the optical element 12 with respect to the base plate.

It should be noted here that the inventive mount is not limited to the precise configuration of mount 10 of FIG. 1. Those skilled in the mechanical arts using mechanical and thermal analysis software, such as NASTRAN, available from NEi Software of Westminster, Calif., can readily modify the configuration to accommodate particular optic shapes sizes and materials, without departing from the spirit and scope of the present invention. Accordingly, the present invention is not limited to the example described and depicted herein. Rather, the invention is limited only by the claims appended hereto.

What is claimed is:

1. Optical apparatus, comprising:
a base-plate;
an optical element;
an element-holding member, fixedly holding the optical element;
a pedestal having a platform-portion for supporting the element-holding member and having spaced-apart legs extending from the platform-portion and attached to the base-plate; and
wherein the element-holding member is attached to the platform-portion of the pedestal by a solder layer, and the platform-portion of the pedestal is temporarily heatable by a removable heat-source to soften the solder layer for aligning the element-holding member on the platform-portion of the pedestal.

2. Optical apparatus, comprising:
a base-plate;
an optical element;
an element-holding member, fixedly holding the optical element;
a pedestal having a platform-portion for supporting the element-holding member and having spaced-apart legs extending from the platform-portion and attached to the base-plate; and
wherein the element-holding member is attached to the platform-portion of the pedestal by a solder layer, and the platform-portion of the pedestal is temporarily heatable by a removable heat-source to soften the solder layer for aligning the element-holding member on the platform-portion of the pedestal, and wherein the removable heat-source is an electrically powered cartridge heater, and the platform-portion has a cavity therein for receiving the cartridge heater.

3. The apparatus of claim 1, wherein, there are two-spaced apart legs and each of the legs is attached to the base-plate by a bracket extending outward therefrom.

4. The apparatus of claim 1, wherein the material of the holding-element and the pedestal are selected to minimize thermal coefficient of expansion mismatch with the optical element.

5. The apparatus of claim 4, wherein the optical element is a fused silica optical element and the material of the element-holding member and the pedestal is Invar.

6. The apparatus of claim 5, wherein the base-plate is made from aluminum or an alloy thereof.

7. The apparatus of claim 4, wherein the optical element is a calcium fluoride optical element and the material of the element-holding member and the pedestal is stainless steel.

8. The apparatus of claim 7, wherein the base-plate is made from aluminum or an alloy thereof.

9. A method of mounting an optical element on a base-plate, comprising the steps of:
attaching the optical element fixedly to an element-holding member;
providing a pedestal for supporting the element-holding member, the pedestal having a platform-portion, the platform portion having spaced apart legs extending therefrom;
attaching the pedestal to the base-plate via the spaced apart legs;
placing the element-holding member on the platform-portion of the pedestal with a solder layer therebetween;
applying heat to the platform-portion of the pedestal sufficient to soften the solder layer;
aligning the element-holding member and the optical element therein on the platform-portion of the pedestal in the softened solder layer; and
discontinuing the application of heat to the platform-portion of the pedestal, thereby allowing the solder layer to solidify and hold the element-holding member in the alignment on the platform portion of the pedestal.

10. A method of mounting an optical element on a base-plate, comprising the steps of:
attaching the optical element fixedly to an element-holding member;

providing a pedestal for supporting the element-holding member, the pedestal having a platform-portion, the platform portion having spaced apart legs extending therefrom;

attaching the pedestal to the base-plate via the spaced apart legs;

placing the element-holding member on the platform-portion of the pedestal with a solder layer therebetween;

applying heat to the platform-portion of the pedestal sufficient to soften the solder layer;

aligning the element-holding member and the optical element therein on the platform-portion of the pedestal in the softened solder layer; and discontinuing the application of heat to the platform-portion of the pedestal, thereby allowing the solder layer to solidify and hold the element-holding member in the alignment on the platform portion of the pedestal, wherein the heat is applied via an electrically powered heater removably inserted into the platform-portion of the pedestal.

11. A method of mounting an optical element to a base plate comprising the steps of:

attaching a pedestal to the base plate, said pedestal having a planar platform, said pedestal including a cavity for receiving a heating element;

attaching the optical element to an element holding member, the element holding member having a planar surface for mating with the platform of the pedestal;

placing the planar surface of the element holding member into abutting relationship with the platform of the pedestal with an intermediate solder layer therebetween;

inserting a heating element into the cavity of the pedestal to heat the pedestal and the solder layer an amount sufficient to permit the relative movement between the holding member and the pedestal so that optical element can be aligned; and discontinuing the heating of the solder layer to allow the solder layer to cool and fixing the position of the holding member with respect to the pedestal.

12. A method as recited in claim 11 wherein the platform is oriented in a non-parallel plane with respect to the base plate and the planar surface of the holding member is oriented at an angle such that adjusting the position of the optical element relative to the pedestal will raise or lower the optical element with respect to the base plate.

13. A method as recited in claim 11 wherein the pedestal is U-shaped having a pair of legs that are attached to the base plate.

14. A method as recited in claim 11 further including the step of removing the heating element from the cavity after the optical element has been aligned.

* * * * *